Inventor

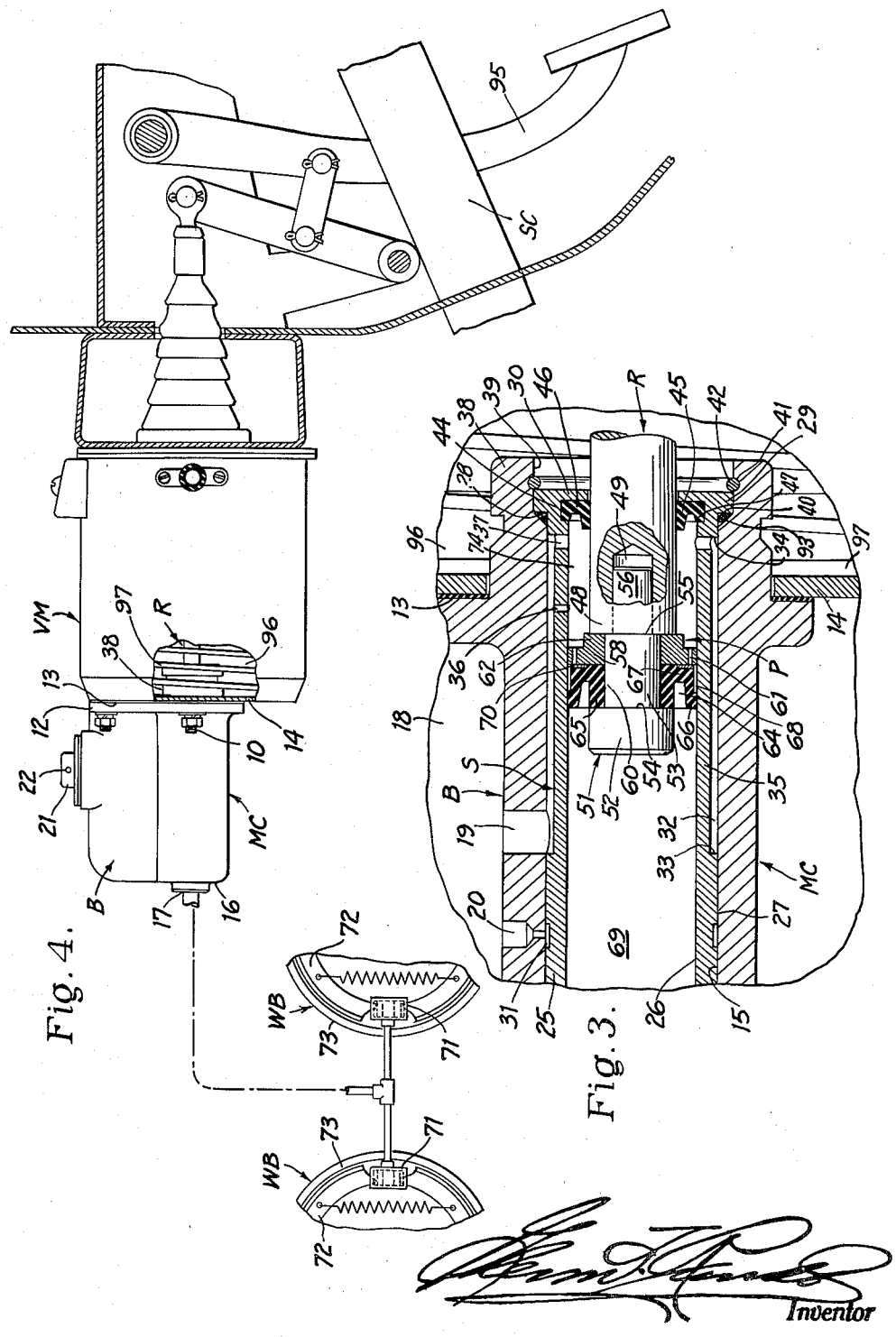

United States Patent Office 2,977,767
Patented Apr. 4, 1961

2,977,767

MASTER CYLINDER FOR HYDRAULIC BRAKE SYSTEMS

Glenn T. Randol, 2nd Ave. and Paull St., P.O. Box 275, Mountain Lake Park, Md.

Filed June 11, 1958, Ser. No. 741,394

4 Claims. (Cl. 60—54.6)

My invention relates to fluid pressure systems such as the hydraulic brake system for automotive vehicles and the like, the invention having particular reference to the construction of the fluid-displacing unit of a master cylinder for such a system.

A primary object of my invention is to provide improved fluid-displacing structure which may be utilized in conventional master cylinders in lieu of the spool-type piston assembly with which such master cylinders are conventionally equipped for operation by a foot pedal or treadle.

A more specific object is to provide a conversion piston or plunger assembly for a conventional master cylinder body which enables the vehicle brakes to be applied with proportionally greater pressure or effective leverage between the brakes and the actuating force, and therefore, especially suited for operation by a pressure differential motor preferably of the type utilizing vacuum commonly employed on present-day motor vehicles as the power-brake actuator, which requires, due to limitations in the available installation space in the engine compartment, and the size of the unit to obtain the pressure differential force, a specially constructed master cylinder of the plunger displacing type having a smaller cross-sectional area that the working cylinder and a longer stroke than conventional piston-type master cylinders, to provide the leverage for a given size motor to develop the necessary braking force. Moreover, in the case where a conventional master cylinder is associated with such a motor, further limitations in the effective pressure are encountered due to the shorter stroke of the piston and larger cross-sectional area thereof. It is therefore, a further object to convert a conventional master cylinder without altering the body or ports thereof in any manner, to increase the operating stroke of the fluid-displacing piston or plunger assembly and to enable different cross-sectional areas of such assembly to be used for a given diameter of the pressure-working chamber to augment the effective pressure available in relation to the actuating force exerted on the assembly as against the piston fomerly employed.

A further important object is to provide a simplified construction and ease of assembly of parts to facilitate ready removal for repair and/or replacement when necessary, and to reduce the cost of a power-brake unit by utilizing the original equipment master cylinder body which may be readily converted to power operation by substituting the piston assembly of the present invention for the conventional piston with which such master cylinders are originally equipped. A further advantage stems from the use of conventional master cylinders for either power and/or operator operation, in that replacement of the cylinder may be made very economically as against the special design for certain power-brakes now on the market, and, too, the same motor design and output may be used in association with all such conventional master cylinders to provide a power-assisted brake system, and therefore, any hydraulic brake system may be readily and economically converted from a driver-operated system to a power-assisted system, particularly such brake systems that employ a suspended-pedal which enables mounting the power-brake unit on the engine side of the firewall for accessibility in the same space previously occupied by the master cylinder.

With these and other objects and advantages in view, the invention consists of the new and novel combination, construction, and arrangement of parts as hereinafter more fully described, set forth in the claims appended hereto, and disclosed in the accompanying drawing forming a part hereof, wherein:

Figure 3 is a fragmentary view of Figure 1 showing the parts in operated positions corresponding to brake "on" condition; and Figure 4 is a schematic depiction of my improved master cylinder associated with a conventional power-assisting motor of the pressure differential type, to operate the hydraulic brake system of a motor vehicle.

Figures 1, 2:
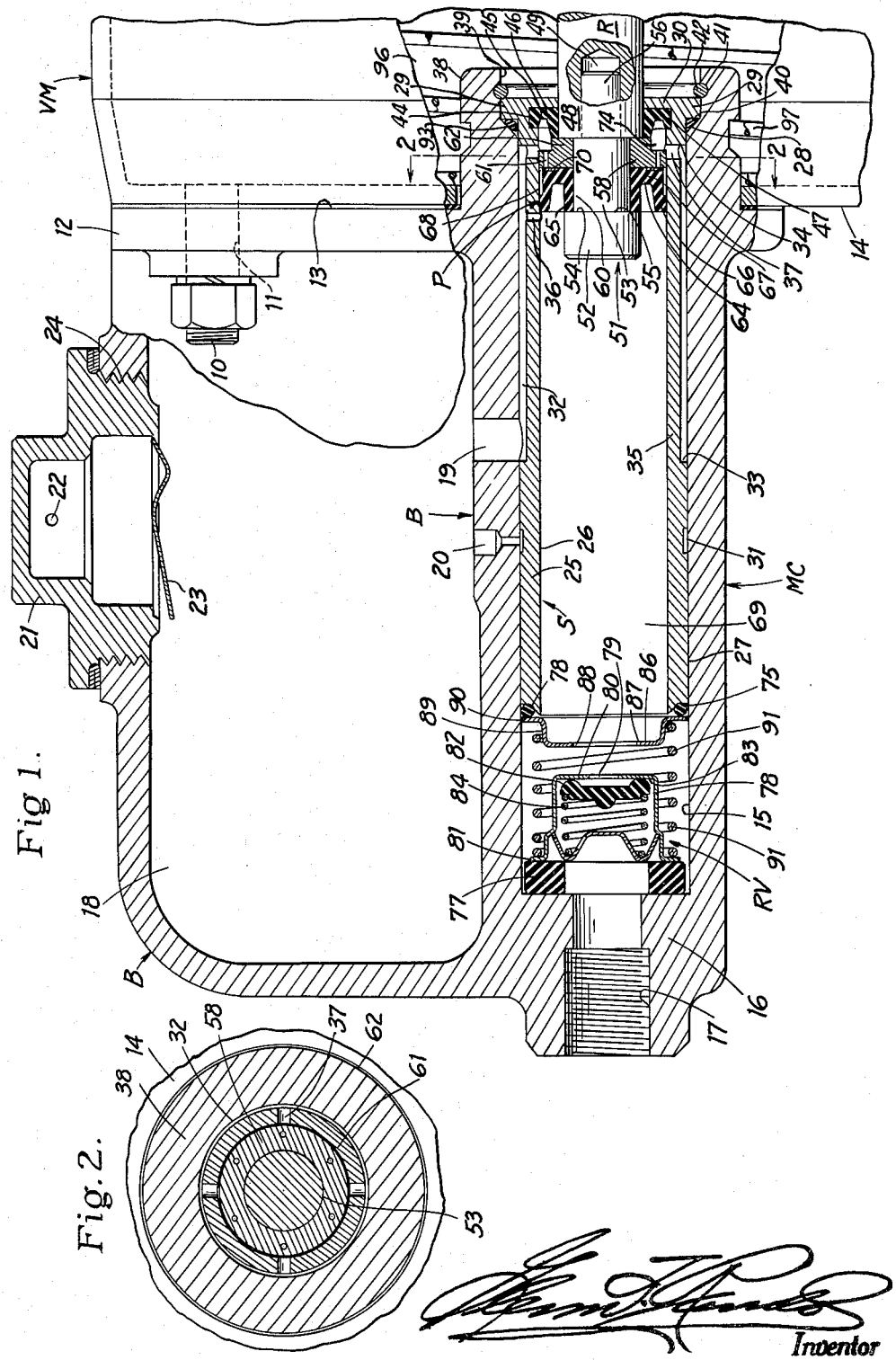
Figure 1 is a longitudinal sectional view through a master cylinder embodying my invention and showing the parts in their normal positions corresponding to brake "off" condition. The approved symbol for indicating the brake fluid has been purposely omitted from all figures of the drawing to prevent obscuring the structure.
Figure 2 is a transverse sectional view taken along the line 2—2 of Figure 1, looking in the direction of the arrows, to show details of the fluid return ports incorporated in a principal part of my invention.

Referring now to the drawings and particularly to Figures 1 and 2, I have used the reference character "MC" to indicate the master cylinder as a whole, and the body is designated by reference character "B" which may be mounted in operating position in the usual manner by bolts 10 projecting through holes 11 in flange 12 having a finished outer surface 13 to secure the cylinder, for example, in air-tight sealed relation to the front end wall 14 of a pressure differential motor "VM" shown fragmentarily in Figure 1, to be operated thereby. The body B has a cylindrical finished bore 15 open at one end and closed at the other by a wall 16 through which a discharge port 17 is provided, a fluid reservoir 18 formed in the body above the bore 15 communicates with the bore 15 via an intake port 19, and a normally disposed compensating port 20 spaced forwardly from the intake port being closed off as will appear. A removable reservoir filler cap 21 is provided with a breather vent at 22 and a baffle member 23 to prevent fluid-surge from discharging fluid through the vent, and which closes a circular threaded opening 24 by threaded engagement therewith, all being of conventional construction.

Fixed in close tolerance relation in the bore 15 is an elongated tubular member disclosed as a cylindrical sleeve generally designated "S" of special construction and comprising: a normal cylindrical wall 25 having inner and outer finished cylindrical surfaces 26, 27 respectively, an angular inner end face 28, outturned and inturned circularly aligned flanges 29, 30 terminating the opposite (rear) end, an annular fluid collector groove or trap 31 in circular alignment with the compensating port 20, an annular channel 32 in the outer surface 27 extending substantially from an intermediate point on the sleeve to the flange 29, said channel defining external annular shoulders 33, 34 and a reduced diameter wall portion 35 through which a compensating port 36 and a plurality of intake ports 37 spaced rearwardly of the port 36 extend to maintain the inner surface 26 and said channel in communication with one another. The sleeve S is removably fitted into the bore 15 in close tolerance relationship such that a fluid-tight sealed relation obtains between the complemental finished surfaces 15, 27, and the groove 31 is circularly aligned with the compensating port 20 to isolate this port from the bore 15 and interior of the sleeve, while intake port 19 maintains fluid communication between the reservoir 18 and channel 32 whereby said port serves in part to supply fluid from the reservoir 18 to the compensating port 36 to replenish any fluid deficiency in the hydraulic system during a braking operation and to return any excess fluid in the system to the reservoir following a braking application as is understood.

Projecting rearwardly from the finished surface on the mounting flange 12 is a hollow hub portion 38 coaxially disposed with respect to bore 15 and having an inner cylindrical surface 39 larger in diameter than the bore 15 to provide an internal annular shoulder at 40 and an internal annular groove 41 in the surface 39 spaced rearwardly of the shoulder 40, the aforesaid sleeve flange 29 engages said shoulder 40 in circular alignment with the space between the shoulder and groove, and a resilient split retainer ring 42 engages said groove to prevent axial displacement of the sleeve S with respect to the bore 15.

An annular internal groove 44 is provided in the inner surface 26 adjacent the flange 30 in circular alignment with the external flange 29, a ring-type pliant packing or seal 45 having a lip portion and a vertical portion or leg 46 with its inner marginal portion 47 engaging the groove 44 to stabilize the seal on the sleeve. An actuatable thrust-transmitting member or cylindrical rod "R" operably projects through the lip portion aforesaid in fluid-tight sealed relation. The inner end 48 of the rod R is provided with a coaxial blind bore 49. A cylindrical stem member 51 is provided with a normal diameter portion 52 terminating the free end thereof and a reduced diameter portion 53 to provide an external annular shoulder 54 therebetween, said reduced diameter portion 53 terminating in a shoulder 55 from which a further reduced diameter portion 56 projects through a thrust element or collar 58 in press-fitted tolerance into the blind bore 49 to impinge the inner marginal portion of the collar between the shoulder 55 and rod end 48 to form a rigid assembly of the stem, collar and rod as best shown in Figures 1 and 2. The reduced diameter portion 53, shoulder 54 and confronting face of the collar 58 define an annular space 60 therebetween. The collar 58 is provided adjacent its periphery with a plurality of longitudinal passageways 61 in circumferentially spaced relationship and an offset annular portion at 62 on the back side. The forward side of the collar is fitted with a ring-type pliant packing or seal 64 comprising a pair of concentrically disposed inner and outer lips 65, 66 interconnected by a vertical wall segment 67, the inner lip is disposed in the space 60 under tension in engagement with the stem, collar and rod to effect a fluid-tight seal therebetween, the outer face of the wall 67 is in intimate contact with the forward face of the collar 58, and the outer surface of the outer lip 66, which is formed with flutes 68 to facilitate movement of fluid across the outer surface of said lip, is radially under tension outwardly against the inner surface 26 of the sleeve S to effect a fluid-tight seal therebetween whereby the collar 58 and seal 64 in assembly on the thrust-rod R as shown in Figure 1 produce what may be termed in a broader patent sense, a piston designated "P" slidably disposed in the sleeve S. The invention contemplates that this assembly may take the form of a piston or a plunger, the difference between these two components being that a piston is shorter than the operating stroke while a plunger is longer than the operating stroke and, too, a plunger may be of less cross-sectional area than the cylinder in which it operates, or the same size.

In the normal retracted or released disposition of the piston P shown in Figure 1, the forward edge of the outer lip 66 of the seal 64 is disposed slightly to the right of the compensating port 36 whereby fluid communication between the reservoir 18 and interior of the sleeve S is provided for an important purpose to be fully described hereinafter. Closure of this port being requisite to pressurizing the fluid as will appear.

Disposed between the inner finished side of the forward end wall 16 of the master cylinder body B and the piston P in normal position, is a variable pressure-working chamber 69 which serves to pressurize the fluid therein. A thin metallic washer 70 is preferably embedded in the peripheral portion of the outer side of the wall segment 67, and which overlies the confronting ends of the passageways 61 to control them by effecting fluid-tight closure thereof when the fluid in the working chamber 69 is under pressure, and thereby closing off the reservoir fluid from that in the working chamber. The peripheral edge of this washer is substantially in alignment with the bottoms of the flutes 68 to facilitate movement of fluid from the reservoir into the working chamber to prevent cavitation which could result from a temporary vacuum condition therein due to rapid withdrawal of the piston P in taking the brakes "off" due to return flow of the brake fluid from the wheel cylinders being slower than the movement of the piston P.

Movement of the piston P into the working chamber 69 reduces its size to pressurize the fluid and discharges it through the discharge port 17 to wheel cylinders 71 of the vehicle brakes generally designated "WB" (see Figure 4) and comprises brake shoes 72 and wheel drums 73, to apply the brakes in a manner well understood. A ring-like expansible fluid chamber 74 is disposed between the peripheral marginal portion on the rear (right) face of the movable collar 58 and confronting portion on the seal 45. This chamber is maintained filled with fluid at atmospheric pressure supplied from the reservoir 18 via ports 19 and 37, and increases in size proportionally to the distance the piston P is advanced into the working chamber 69 as best demonstrated in Figure 3. Accordingly, as the pressure-working chamber 69 contracts to pressurize the fluid therein, the fluid chamber 74 expands which accommodates a larger volume of fluid to enter from the supply reservoir 18 to prevent cavitation as the piston P applies pressure on the fluid in chamber 69. Chamber 74 serves to collect any leaky fluid that may escape from the working chamber 69 and returns such to the reservoir via ports 37 and 19, and also serves to maintain chamber 69 filled during release of the piston P, particularly in the event a temporary vacuum is created in the manner mentioned above.

The angular inner end face 28 of the sleeve S is preferably fitted with a pliant O-ring seal 75 of commercial construction to seal off the exterior of the sleeve S from the working chamber 69.

A removable ring-type valve seat 77, preferably made of pliant material, encircles the inner end of the discharge port 17 in intimate contact with the finished inner surface on the end wall 16. A residual pressure check-valve assembly generally designated "RV" having a cup-shaped housing 78 with an opening 79 through its end wall 80, and its open end being formed with an outturned annular flange 81 parallel to the end wall to movably engage the seat 77, said check valve assembly including a self-contained discharge one-way check-valve 82 for enabling fluid under pressure to be displaced through the discharge port 17, and which cooperates with an annular seat 83 encircling the opening 79 under influence of a normally preloaded compression spring 84. A cup-shaped member 86 having an end wall 87 provided with a central opening 88 and the opposite or open end of the cylindrical wall 89 terminates in an outturned vertical flange 90 in parallel relation to the end wall 87, which engages the O-ring 75. Another normally preloaded compression spring 91 is operably disposed between flanges 81, 90 and continuously reacts on these flanges to urge them into engagement with the seat 77 and the O-ring 75 into effective fluid sealing relation with respect to the angular end face 28 and bore 15, respectively. The biasing action of spring 91 against the O-ring is supplemented by the force of the pressurized fluid during the braking action to prevent fluid loss, and therefore pressure, between the complemental cylindrical surfaces 15, 27. The preloaded status of spring 91 is commercially set at 8–12# to establish a residual line pressure corresponding to such preloaded strength of said spring which also continuously reacts on the O-ring 75 to maintain it under compression in sealing condition to prevent possible fluid-leakby between the sleeve S and bore 15.

Another pliant O-ring 93 of commercial construction is provided between juncture of the cylindrical wall 25 and flange 29 and the confronting chamfered rear end of the bore 15 to insure a fluid-tight seal at this point even though only fluid under static (non-pressurized) condition is present at all times.

An exemplarily commercial application of my improved master cylinder MC is schematically illustrated in Figure 4 wherein the conventional vacuum-booster motor VM of conventional construction and operation is mounted on the vehicle indicated by fragmentary portions of its firewall and associated steering column "SC," said motor being employed to actuate the thrust-transmitting rod R and thereby slidably actuate the piston P simultaneously therewith within the sleeve S to pressurize the fluid in the pressure-working chamber 69 to effect the braking action in response to reduced operator effort applied to pedal 95. Operably disposed within the vacuum-power chamber 96 of the motor VM is a normally preloaded compression spring shown at 97 which continuously urges the movable power assembly (not shown) toward the right or released position shown in this figure wherein the piston P is correspondingly disposed in Figure 1. Accordingly, since piston P and the movable power assembly of the motor act together, the spring 97 serving to urge the piston P toward its normal released position to take the brakes "off" as air is admitted into the power chamber in response to removing pressure from the pedal 95 as the art profusely demonstrates.

*Operation*

In the operation of my improved master cylinder, the parts are normally in the positions of Figure 1 under action of the spring 97. This spring reacts on the piston P to reset it and whatever type of actuating mechanism, such as the illustrated motor VM, or the pedal 95 alone, is employed to drive the piston into the sleeve S against the action of spring 97 to reduce the size of the working chamber 69 and thereby pressurize the fluid to effect the braking action. Initial movement of the piston to the left as viewed in Figure 1 toward Figure 3 position, places the edge of the lip 66 of the seal 64 over the compensating port 36 to thus isolate the reservoir fluid from that in the working chamber 69 which operation conditions the master cylinder MC to pressurize the fluid to actuate the wheel cylinders and thus expand the brake shoes 72 into frictional contact with the brake drums 73 to whatever degree necessary to stop or slow the vehicle as required. Accordingly, the operation of my improved master cylinder MC is similar to the operation of commercial master cylinders used in present-day hydraulic braking systems. However, my improved master cylinder combines new and novel interaction and arrangement of the fluid displacing parts which replace the conventional spool-type piston with facility to convert a conventional master cylinder to one which is capable of being operated through a longer stroke and by either a piston or plunger-type fluid-displacing unit of different cross-sectional areas not necessarily the same cross-section as the cylinder, to make such conventional master cylinder bodies readily adaptable to operation by any commercial type of vacuum or air-pressure operated motor to produce the required line pressure for power-brakes, especially of the "low-pedal" type which combines shorter travel and less mechanical advantage for the operator.

As the piston P is driven into the cylindrical sleeve S after the compensating port 36 has been closed to the position shown in Figure 3, the fluid in the working chamber 69 becomes pressurized by the output of the motor VM assisting operator force exerted on the pedal 95 (see Figure 4), to such magnitude that the brake shoes 72 are brought into sufficient frictional contact with their respective brake drums as to effect the decelerating force desired. Under these circumstances the compensating port 36 remains closed and also the passageways 61. This completes the "brake-applied" condition.

To release the brakes, the operator only has to remove foot pressure from the pedal 95, which admits air into the power chamber 96 by way of the control valve (not shown) enabling the return spring 97 to withdraw the piston P and power assembly (not shown) toward their respective released positions demonstrated in Figures 1 and 4. During this releasing movement of the piston P fluid is drawn, particularly during a fast release, from the reservoir 18 through the passageways 61, flutes 68 over the outer lip 61 into the working chamber 69 to maintain the system filled, such replenishment being effected by a temporary vacuum condition which may obtain in the working chamber 69 as a result of such fast withdrawal of the piston P. Upon full release of the piston as shown in Figure 1, the compensating port 36 is again opened to accommodate any excess fluid in the system to return to the reservoir 18 and thus maintain the system filled. During this releasing operation there is also another operation occurring as a function of the residual pressure valve RV which becomes unseated to enable the return fluid to pass from the wheel cylinders 71 back into the pressure working chamber 69 while the discharge check-valve 82 remains closed. After the piston P and associated movable parts assume their normal released positions, the residual pressure valve seats under influence of spring 84 to establish the line pressure external to the discharge port at the minimum pressure of 8–12# according to factory specifications, and the fluid in the chamber 69 and reservoir 18 is adjusted to its normal condition at atmospheric pressure by the interflow accommodated by the open compensating port 36 in readiness for another braking cycle.

Braking applications requiring extremely high pressure conditions within the working chamber 69, may force a minute quantity of fluid past the O-ring 75 and eventually, where the brakes are sustained "on" under such conditions, such leakby may displace between the sleeve S and bore 15 to the collector groove 31, the latter serving to trap such forced leakby and return it to the reservoir 18 via the port 20 best demonstrated in Figure 1.

While I have disclosed a special type of sleeve construction for converting a conventional master cylinder body to produce higher pressure conditions than normally available from a given power output. Acting on a spool-type piston with which such master cylinders are equipped, I wish to make it clear that my invention contemplates integrating at least the forward portion of sleeve S with the cylindrical wall of bore 15, and therefore, port 20 would, in such case, be eliminated as well as the angular end 28, O-ring 75 and spring seat 86. In such a rearrangement of the parts, spring 91 could be either contained in the residual pressure valve housing, or would react on the forward end 52 of the thrust-transmitting member R, and, of course, commercial design would dictate such variations since the residual pressure valve RV may be disposed in the working chamber as in the present disclosure or in a branch hydraulic line leading from said working chamber both of which are commercially practiced.

From the foregoing description augmented by an inspection of the drawing, it will be seen that I have produced a new and novel removable fluid-displacing unit or assembly for incorporation in conventional master cylinder bodies in lieu of the spool-type piston with which such cylinders are normally equipped; that this fluid-displacing unit may take the form of a piston or a plunger with the latter of the same or less cross-sectional area than the cylinder; that such fluid-displacing unit provides for a longer working stroke within the limits of the cylinder body to increase the leverage-ratio with respect to the brake cylinders thus rendering the actuation thereof quite suitable for pressure differential motors of either the operator-assisted or full-power type. A further advantage is provided by utilizing the conventional master cylinder body which comes with the car as original equipment, to eliminate this portion of the cost of the powerbrake unit thus providing a low-cost easily installed powerbrake without eliminating any of the components comprising the hydraulic brake system with which present-day motor cars are equipped.

Reference is now made to the terminology used in the foregoing description and in the appended claims in which the identifying expressions and/or terms employed are intended to convey meanings which include the range of reasonable equivalents in the patent sense. For example, the expressions "motor," "power chamber," "vacuum chamber," "booster," "pedal," etc., are intended to include any means for actuating the thrust-transmitting member R, whether such member includes a hydraulic piston or plunger, or some other member serving the same purpose. The terms "left," "right," "rear," "front," "top," "vertical," "horizontal," and other directional words or characters are intended to have only relative connotation for convenience in describing the structure in the position depicted on the drawing, and are not intended to be interpreted as requiring any particular orientation with respect to associated structure external to the present disclosure or the operating position thereof.

Although the embodiment of my invention as disclosed herein and which is well calculated to fulfill the objects above stated, it will be appreciated that I do not wish such to be limited to the exact construction and/or arrangement of parts shown, since it is evident that modifications, variations, changes and substitutions may be made therein without departing from the proper scope or fair meaning of the subjoined claims.

Having thus described my invention, I claim:

1. In a master cylinder of the character disclosed, a cylinder body, a longitudinal bore in said body closed at one end and open at the other, a reservoir in said body disposed above the said bore, a port interconnecting the bore and reservoir, an intake port spaced from the first-mentioned port for interconnecting the reservoir and bore, a discharge port through the closed end of said bore, a counterbore terminating the open end of said longitudinal bore; an internal annular shoulder provided between said bores, and an internal annular groove provided in the counterbore in spaced relation with respect to said annular shoulder, the improvement which comprises: a removable cylindrical sleeve disposed in said longitudinal bore; an outturned annular flange terminating the end of the sleeve adjacent the open end of said longitudinal bore and in circular alignment with the space obtaining between the annular shoulder and groove aforesaid in engagement with said shoulder; a split retainer ring engaging said groove to prevent axial displacement of the sleeve with respect to the cylinder body; an internal annular channel in the inner surface of the sleeve in circular alignment substantially with the outturned flange aforesaid; a ring-type single lip pliant sealing member having a circular segment and an inner peripheral lip segment normal to said circular segment with the inner marginal portion of the circular segment disposed under tension in the internal annular channel aforesaid; a pair of longitudinally spaced annular shoulders in the outer surface of the sleeve to define an annular fluid chamber therebetween in constant communication with said intake port; means on the sleeve for closing the first-mentioned port to permanently negate its function; a thrust-transmitting rod having a fluid-displacing portion operably projecting through the lip segment of the sealing member aforesaid into the interior of the sleeve; a piston terminating the end of the displacing portion of said thrust-transmitting rod for reciprocable movement therewith in the sleeve in fluid-tight sealed relation; a variable pressure-working chamber disposed normally between the closed end of the longitudinal bore and pressure face on said piston in released position; a compensating port in said sleeve normally interconnecting said annular fluid chamber and said working chamber when said piston is in released position, initial movement of said piston from released position being effective to close said compensating port thereby conditioning said working chamber to pressurize the fluid therein; an expansible ring-like chamber disposed between the opposite face on said piston and said sealing member; a port through the wall of said sleeve spaced from said compensating port for interconnecting said expansible chamber and annular fluid chamber; and means for actuating said thrust-transmitting rod to reduce the size of said pressure working chamber to effect displacement of fluid under pressure through the said discharge port.

2. A master cylinder according to claim 1 including an angular face on the inner end of said sleeve; a V-shaped annular channel formed between said angular face and longitudinal bore; a pliant ring-type packing disposed in said V-shaped channel; a cup-shaped member open at one end and closed at the other; a normally preloaded compression spring disposed in the longitudinal bore in said body and having opposite ends thereof reacting on the closed end of said bore and said cup-shaped member; an outturned annular flange terminating the open end of said cup-shaped member and bearing against said packing under influence of said spring to maintain pressure thereagainst to effect fluidtight sealing relation with respect to the said V-shaped channel; and a central aperture through the closed end of said cup-shaped member to provide unrestricted fluid communication between opposite sides thereof.

3. A master cylinder according to claim 2 including an annular channel of triangular cross-section provided between the outer end of the longitudinal bore and the juncture of the sleeve and outturned flange at the outer terminus of said sleeve; and a ring-type packing disposed in said annular channel to effect a fluid-tight connection of the said outturned flange, sleeve and said bore.

4. In a master cylinder open at one end and closed at the other, a fluid outlet through the closed end of said cylinder, a fluid supply reservoir for said cylinder, a removable cylindrical sleeve fixed in said cylinder with its inner end spaced from the closed end thereof, an annular fluid space disposed between circularly aligned portions of the interior of said cylinder and exterior of said sleeve, in continuous communication with said reservoir, a pair of longitudinally spaced fluid openings in said sleeve in continuous communication with said fluid space, a pressure-working chamber defined by cooperating portions of the interiors of the cylinder and sleeve, a fixed sealing assembly having separate circularly aligned outer and inner annular packings associated with that end of the sleeve adjacent the open end of said cylinder, said outer packing providing a sealed closure between said cylinder and sleeve, the improvement which comprises: an actuable cylindrical fluid-displacement unit having a normal body portion which passes through the aforesaid inner annular packing and an enlarged head portion projecting into said sleeve from a normally released position wherein the head portion opens one of said fluid openings to communicate with said working chamber, to an operating position whereat said one opening is isolated by said head portion from the working chamber to enable pressurization of the fluid therein; an expansible annular fluid chamber in continuous communication with said fluid space via said other fluid opening, said expansible chamber being defined by said head portion and the inner annular packing aforesaid in coaxial disposition with respect to said working chamber; an annular channel between the inner end of said sleeve and the cylindrical surface of said cylinder; a complemental annular packing engaging said channel to seal off pressure seepage via said sleeve and cylinder to said reservoir; a movable member adapted to apply sealing pressure on said last-mentioned packing; a normally preloaded spring operably disposed in said working chamber to react between the closed end of the cylinder and said movable member to apply in part said sealing pressure on said last-mentioned packing supplemented by hydraulic pressure on the fluid in said working chamber, when pressurized; and means for actuating said fluid-displacement unit from normal position to thereby sequentially close the said one fluid opening and pressurize the fluid in said working chamber for excursion through said outlet.

References Cited in the file of this patent

UNITED STATES PATENTS

| | | |
|---|---|---|
| 2,074,719 | Carroll | Mar. 23, 1937 |
| 2,156,205 | Swift | Apr. 25, 1939 |
| 2,232,113 | Katcher | Feb. 18, 1941 |
| 2,232,349 | Swift | Feb. 18, 1941 |
| 2,317,601 | Fowler | Apr. 27, 1943 |
| 2,325,284 | Swift | July 27, 1943 |
| 2,663,540 | Erickson | Dec. 22, 1953 |
| 2,759,329 | Ponti | Aug. 21, 1956 |
| 2,845,147 | Hill | July 29, 1958 |

FOREIGN PATENTS

| | | |
|---|---|---|
| 544,669 | Great Britain | Apr. 22, 1942 |